US005540383A

United States Patent [19]
Ducey

[11] Patent Number: 5,540,383
[45] Date of Patent: Jul. 30, 1996

[54] METHOD AND APPARATUS FOR SPRAYING PRESSURIZED WATER

[75] Inventor: Lawrence E. Ducey, Silver Spring, Md.

[73] Assignee: Potomac Rain Room, Inc., Rockville, Md.

[21] Appl. No.: 238,539

[22] Filed: May 4, 1994

Related U.S. Application Data

[63] Continuation-in-part of Ser. No. 236,000, Dec. 10, 1993.
[51] Int. Cl.⁶ ........................................ B05B 1/16
[52] U.S. Cl. .............................. 239/1; 239/550; 239/289
[58] Field of Search ................................ 239/2.1, 14.1, 239/266–269, 273, 280–281, 550, 566, 282, 289, 1; 4/599–603, 569; 47/17; 135/96

[56] References Cited

U.S. PATENT DOCUMENTS

| | | | |
|---|---|---|---|
| 3,788,542 | 1/1974 | Mee | 239/2.1 |
| 3,894,691 | 7/1975 | Mee | 239/524 |
| 3,992,813 | 11/1976 | Freshel | 239/269 |
| 4,039,144 | 8/1977 | Mee | 239/2 R |
| 5,027,455 | 7/1991 | Commisso et al. | 239/289 |
| 5,121,882 | 6/1992 | Skidmore | 239/269 |
| 5,154,356 | 10/1992 | Sorenson | 239/566 |
| 5,273,214 | 12/1993 | Huffstutler | 239/273 |
| 5,330,104 | 7/1994 | Marcus | 239/273 |
| 5,337,960 | 8/1994 | Allen | 239/280.5 |

OTHER PUBLICATIONS

"Tom Mee Doesn't Mind Being In A Fog", *People*, Feb. 10, 1986.
"Mee Industries: A Clear Solution For Fog", by Ambrosini, 1992.
"Fog . . . the stuff of clouds", pamphlet, Mee Industries Inc.
"The Mee Fog Nozzle", Oct. 13, 1992, Mee Industries Inc.
"High Flow Couplings", Parker Fluid Connectors.
"California: Desert in Disguies", Conhiff, *National Geographic*, Nov. 1993, Special Edition:Water.
"Getting Help in Coping With Too Much of a Good Thing", Applegate.
1/4LN Hydraulic Atomizing Spray Nozzle Volume Median Diameter vs Pressure Curves Capacities LNO.6 thru LN26, Spraying Systems Co., Wheaton, IL.
"Spray Nozzles and Accessories" Spraying Systems Co. Industrial Catalog 27 pp. 36–44, 73, and 85; Date Unknown.

*Primary Examiner*—Karen B. Merritt
*Attorney, Agent, or Firm*—Burns, Doane, Swecker & Mathis LLP

[57] ABSTRACT

A spray apparatus includes a pump for pressurizing water, a drive unit for driving the pump, a flow regulator for regulating the flow of water pressurized by the pump, and a modular spray assembly. The modular spray assembly includes piping connected to the pump, a plurality of quick coupler units connected to the piping, and water outlets connected to the quick coupler units through which the pressurized water is sprayed, wherein the pressurized sprayed water creates a mist and a wind. The spray apparatus can be assembled in a tent-like structure to provide a rain room, wherein a mist and a wind are generated by the apparatus.

8 Claims, 5 Drawing Sheets

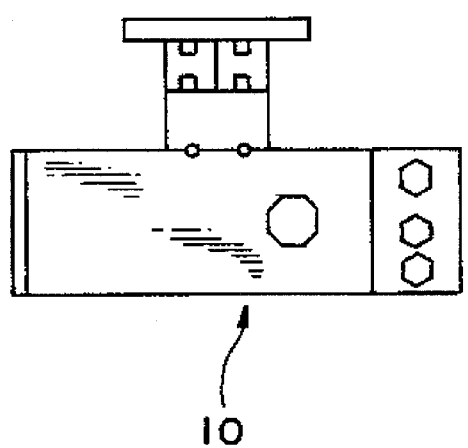
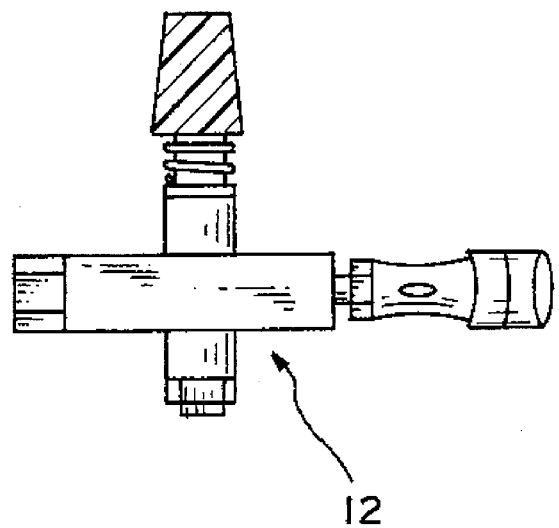
FIG. 7  FIG. 9
FIG. 8
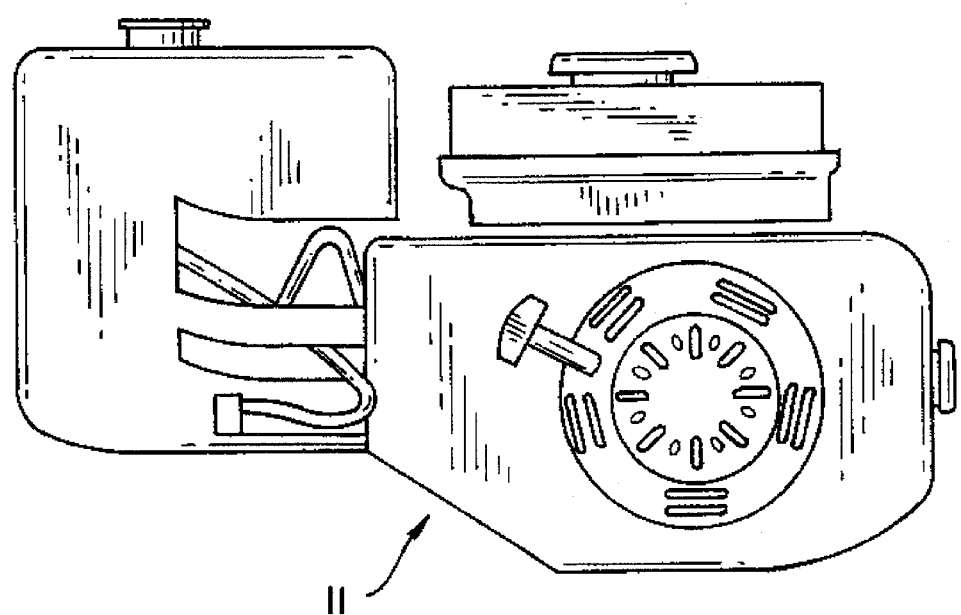

| NOZZLE SIZE | ORIFICE DIAM. (INCHES) | 40 PSI | 100 PSI | 250 PSI | 500 PSI | 600 PSI | 700 PSI | 800 PSI | 1000 PSI | 1200 PSI | 1500 PSI | 2000 PSI | 2500 PSI | 3000 PSI | 3500 PSI | 4000 PSI |
|---|---|---|---|---|---|---|---|---|---|---|---|---|---|---|---|---|
| 2 | .034 | .20 | .32 | .50 | .71 | .77 | .80 | .89 | 1.0 | 1.1 | 1.2 | 1.4 | 1.6 | 1.7 | 1.9 | 2.0 |
| 4 | .052 | .40 | .63 | 1.00 | 1.40 | 1.60 | 1.70 | 1.80 | 2.0 | 2.2 | 2.5 | 2.8 | 3.1 | 3.5 | 3.8 | 4.0 |
| 4.5 | .055 | .45 | .71 | 1.10 | 1.50 | 1.70 | 1.90 | 2.00 | 2.2 | 2.4 | 2.8 | 3.0 | 3.6 | 3.9 | 4.3 | 4.5 |
| 5 | .057 | .50 | .79 | 1.30 | 1.80 | 1.90 | 2.10 | 2.20 | 2.5 | 2.8 | 3.1 | 3.6 | 4.0 | 4.4 | 4.7 | 5.0 |
| 5.5 | .060 | .55 | .87 | 1.40 | 1.90 | 2.10 | 2.30 | 2.50 | 2.8 | 3.0 | 3.4 | 3.8 | 4.4 | 4.8 | 5.2 | 5.5 |
| 6 | .062 | .60 | .95 | 1.50 | 2.10 | 2.30 | 2.50 | 2.70 | 3.0 | 3.2 | 3.7 | 4.2 | 4.8 | 5.2 | 5.6 | 6.0 |
| 6.5 | .064 | .65 | 1.00 | 1.70 | 2.30 | 2.50 | 2.70 | 2.90 | 3.3 | 3.6 | 4.0 | 4.6 | 5.2 | 5.7 | 6.0 | 6.5 |
| 7 | .067 | .70 | 1.10 | 1.80 | 2.50 | 2.70 | 2.90 | 3.10 | 3.5 | 3.8 | 4.3 | 5.0 | 5.6 | 6.1 | 6.6 | 7.0 |
| 7.5 | .070 | .75 | 1.20 | 1.90 | 2.70 | 2.90 | 3.20 | 3.40 | 3.8 | 4.1 | 4.6 | 5.3 | 6.0 | 6.5 | 7.0 | 7.5 |
| 8 | .072 | .80 | 1.30 | 2.00 | 2.80 | 3.10 | 3.40 | 3.60 | 4.0 | 4.4 | 5.0 | 5.6 | 6.2 | 7.0 | 7.5 | 8.0 |
| 8.5 | .074 | .85 | 1.30 | 2.20 | 3.00 | 3.30 | 3.60 | 3.80 | 4.3 | 4.6 | 5.3 | 6.0 | 6.7 | 7.4 | 8.0 | 8.5 |
| 9 | .076 | .90 | 1.40 | 2.30 | 3.20 | 3.50 | 3.80 | 4.00 | 4.5 | 5.0 | 5.5 | 6.4 | 7.1 | 7.8 | 8.5 | 9.0 |
| 9.5 | .078 | .95 | 1.50 | 2.40 | 3.40 | 3.70 | 4.00 | 4.30 | 4.8 | 5.2 | 5.8 | 6.8 | 7.6 | 8.3 | 9.0 | 9.5 |
| 10 | .080 | 1.00 | 1.60 | 2.50 | 3.50 | 3.90 | 4.20 | 4.50 | 5.0 | 5.4 | 6.1 | 7.0 | 8.0 | 8.7 | 9.4 | 10.0 |
| 12 | .087 | 1.20 | 1.90 | 3.00 | 4.20 | 4.60 | 5.00 | 5.40 | 6.0 | 6.4 | 7.3 | 8.4 | 9.5 | 10.4 | 11.2 | 12.0 |
| 15 | .094 | 1.50 | 2.40 | 3.80 | 5.30 | 5.80 | 6.40 | 6.80 | 7.5 | 8.2 | 9.2 | 10.6 | 12.0 | 12.9 | 14.0 | 15.0 |
| 20 | .109 | 2.00 | 3.20 | 5.00 | 7.10 | 7.80 | 8.40 | 9.00 | 10.00 | 10.8 | 12.2 | 14.2 | 16.0 | 17.4 | 18.8 | 20.0 |
| 30 | .141 | 3.00 | 4.70 | 7.50 | 10.60 | 11.60 | 12.80 | 13.60 | 15.00 | 16.40 | 18.40 | 21.2 | 24.0 | 26.0 | 28.0 | 30.0 |
| 40 | .156 | 4.00 | 6.30 | 10.00 | 14.20 | 15.60 | 16.80 | 18.00 | 20.00 | 21.60 | 24.40 | 28.4 | 32.0 | 34.8 | 37.6 | 40.0 |

METHOD AND APPARATUS FOR SPRAYING PRESSURIZED WATER

CROSS-REFERENCE TO RELATED APPLICATIONS

The present application is a continuation-in-part of U.S. Ser. No. 08/236,000, filed on Dec. 10, 1993, entitled The Rain Room, the subject matter of which is incorporated herein by reference.

BACKGROUND OF THE INVENTION

1. Field of the Invention

The present invention relates to a method and apparatus for spraying water, and more particularly to a method and apparatus for spraying a fine mist of water in order to cool off and/or entertain people.

2. Description of Related Art

For generations, children, and even an occasional adult, have fought summer heat by running through lawn sprinklers. Although that activity is enjoyable, the spray from the lawn sprinkler tends to be rather coarse. Accordingly, the participants usually get very wet, very quickly.

In another attempt to cool people, some hotels in warmer clients have installed nozzles in sunbathing areas so that sunbathers may be misted with a very fine, gentle spraying of mist as they sit in the sun. These systems are permanently plumbed to an exterior wall or other structure of the hotel, and are not intended to be portable or otherwise dismantled. In addition, the mist admitted from such nozzles is intended to be barely noticeable by the sunbathers. Specifically, the spray is very subtle. See pages 40–41 of Water The Power, Promise, and Turmoil of North America's Fresh Water, National Geographic Special Edition,® 1993.

Another device of interest is fog making equipment that has been developed and used in the movie industry. This equipment is intended to be laid on the ground to emit a mist in such a manner so as to create fog along the ground. See U.S. Pat. Nos. 3,788,542; 3,894,691; and 4,039,144.

OBJECTS AND SUMMARY

It is an object of the present invention to provide heat relief to large crowds of people for safety and entertainment using environmentally friendly equipment and methods.

It is another object of the present invention to allow for varying degrees of mist to meet different crowd preferences, so that it is not necessary to get soaked to bring the body temperature down.

It is yet another object of the present invention to provide a modular spray assembly for spraying pressurized water.

It is still another object of the present invention to provide a temporary structure and spray assembly for spraying pressurized water which has a variable size depending on the crowd requirements.

It is another object of the present invention to provide a spray assembly for spraying pressurized water which creates a windy environment which is entertaining for all ages.

It is another object of the present invention to provide a modular spray assembly which is easy to put together and install.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 7 is a top view illustration of a pump used in an embodiment of the present invention;

FIG. 8 is a side view of a drive unit used in an embodiment of the present invention;

FIG. 9 is a top view of a flow and pressure regulator used in an embodiment of the present invention;

DETAILED DESCRIPTION OF THE PREFERRED EMBODIMENTS

According to the present invention, an apparatus is provided for relief from hot weather for safety and entertainment using environmentally friendly methods.

The present invention relates to an apparatus for spraying pressurized water having a pump, a drive unit, an adjustable flow and pressure regulator which provides for spray control, and a spray assembly for spraying the pressurized water. The modular spray assembly includes piping, fittings and nozzles or water outlets. The nozzles are selected to provide an outlet for the pressurized water, and are placed in a configuration such that when pressurized water is sprayed through them, mist is created and wind is generated.

According to one embodiment of the present invention, people enter a structure, such as a tent, having attached therein a spray assembly that emits a fine mist and wind. The tent may be either a fabric material over a frame or a structure having inflatable walls and roof. The structure may be temporarily or permanently located. The water is output through the spray assembly at a selected pressure and in a configuration so as to create mist and wind in the structure.

The pressure of the water may range from about 40 psi to about 1500 psi, or more preferably between 100 psi to 1000 psi, with a preferred pressure of about 600 psi. The volume of water delivered to the nozzles can be adjusted by changing the flow rate and/or the pressure of the water. These adjustments can be made by a pump, a flow regulator, and a drive unit. The mist configuration can be changed by using nozzles of different sizes and shapes, and by adjusting the angular orientation of the nozzles. The apparatus may fill the area inside the structure with mist and wind in which people can obtain relief from the heat.

The size of the water droplets emitted from the nozzles depends on at least three factors: the size of the nozzle opening, the pressure at which the water is delivered to the nozzles, and the angle of the nozzle. The following table sets forth the approximate size of water droplets emitted from a size 1 nozzle, which has a opening diameter of about 0.026 inches, under 500 psi and 1000 psi:

|  | 110 degrees | 80 degrees | 40 degrees |
| --- | --- | --- | --- |
| 500 psi | 150 microns | 175 microns | 200 microns |
| 1000 psi | 85 microns | 120 microns | 170 microns |

Water droplets in the range set forth in the foregoing table (85 to 200 microns) are so small and light that they tend to be blown around quite easily as they fall to the ground. Furthermore, in view of their small size, the water droplets tend to evaporate prior to reaching the ground. As explained in more detail below, such evaporation has a chilling effect.

Figure 1:
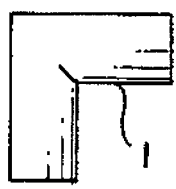
FIG. 1 is an example of a fitting used according to an embodiment of the present invention.
Figure 2:
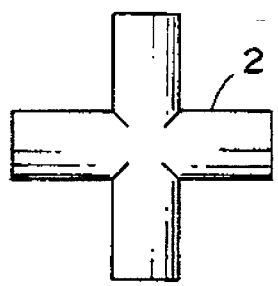
FIG. 2 is an example of another fitting used according to an embodiment of the present invention.
Figure 3:
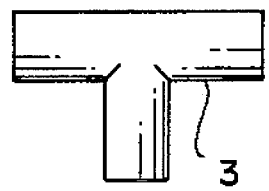
FIG. 3 is an example of another fitting used according to an embodiment of the present invention.

FIG. 1 illustrates a substantially elbow shaped fitting 1 for use in constructing the spray assembly according to the present invention. FIG. 2 illustrates a four-way fitting 2, and FIG. 3 illustrates a three-way T-shaped fitting 3 for use in the spray assembly according to the present invention.

According to a preferred embodiment, the fittings and piping described herein can be made of copper or brass. Other suitable materials may be used, such as other metals or plastics within the skill of the ordinary artisan once in possession of the instant disclosure.

Figure 4A:
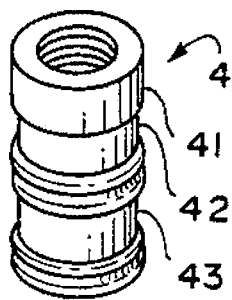
FIG. 4A is an example of a quick coupler fitting used according to an embodiment of the present invention.
Figure 5:
FIG. 5 illustrates the coupling of the plug of FIG. 4B with the nozzle of FIG. 4C according to an embodiment of the present invention.

FIG. 4A illustrates a quick coupler fitting 4 for use in the spray assembly according to the present invention. One such quick coupler 4 is the model no. BST-2 or BST-3, sold by Parker Fluid Connectors of Minneapolis, Minn. The quick coupler fitting 4 includes an upper portion 41 into which a threaded connector is inserted. The connector may be a simple threaded piece of pipe that is used to connect the quick coupler fittings to pipe fittings, as is known in the art.

The quick coupler fitting 4 of FIG. 4A also includes a lower portion 42 and a movable portion 43. The lower portion 42 is smaller in diameter than the upper portion 41 and the movable portion 43 such that the movable portion 43 can slide over the lower portion 42 until it is stopped by the upper portion 41 to provide the quick coupling effect. Sliding the movable portion 43 enables ball bearings to be retracted so that a connector may be released. See FIG. 12 for a cross-sectional view of a quick coupler connector.

Figure 4B:
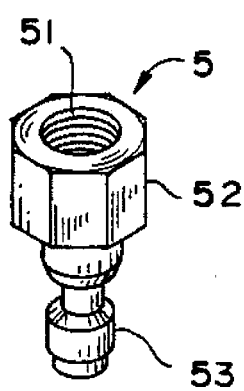
FIG. 4B is an example of a plug for use with the quick coupler fitting of FIG. 4A according to an embodiment of the present invention.

FIG. 4B illustrates a quick coupling plug 5 for insertion into the quick coupler fitting 4. Quick coupling plug 5 includes a lower portion 53 which can be inserted into the quick coupler fitting 4 when the movable portion 43 is slid away from the upper portion 41. Releasing the movable portion 43 then provides the coupling effect by locking the lower portion 53 into the quick coupler fitting 4. Quick coupling plug 5 also includes an upper portion 52 which has a threaded hole 51, the use of which will be described below. An exemplary quick coupling plug 5 is model no. SST-N2 or SST-N3, available from Parker Fluid Connectors of Minneapolis, Minn.

Figure 4C:
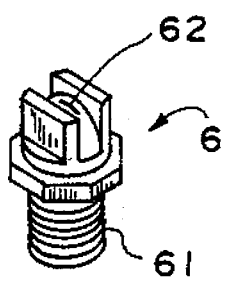
FIG. 4C is an example of a nozzle for use with the plug of FIG. 4B and according to an embodiment of the present invention.

FIG. 4C illustrates a nozzle 6 which includes a threaded portion 61 to be threaded in the hole 51 of the quick coupling plug 5. The nozzle 6 includes an opening 62 through which water is emitted. An exemplary water outlet or nozzle can be obtained from Spraying Systems Co., part no. H1/4W 8001. The present invention can be implemented using a number of different nozzles having different angles and nozzle sizes. According to one embodiment, a one-quarter inch VEEJET nozzle can be used. Preferable angles are about 110°, 90° or 80°, although other nozzle angles can be used. The smaller the nozzle angle, the straighter the nozzle output is sprayed. Therefore, larger angles achieve coverage of a larger area with a softer spray than is achieved using smaller angles. The nozzle orifice diameter is preferably within the range of 0.026 to 0.070 inches or greater.

Figure 6A:
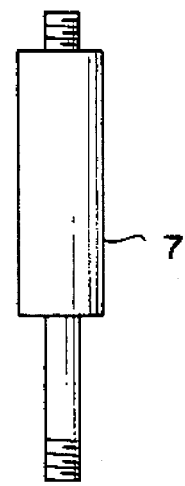
FIGS. 6A through 6C are examples of piping used in an embodiment of the present invention.
Figures 6B, 6C:
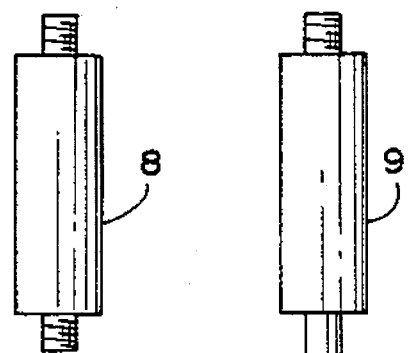
Figure 10:
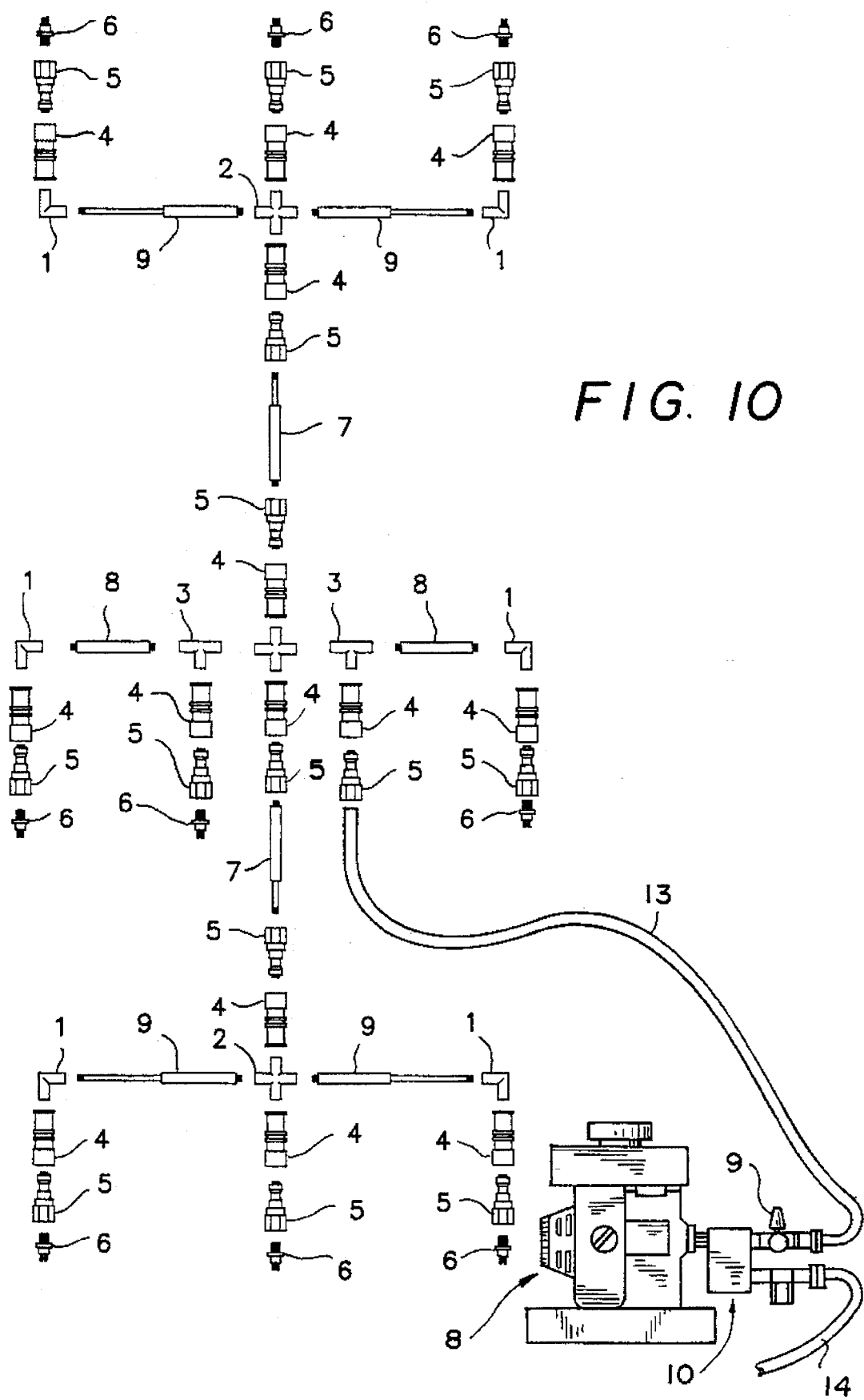
FIG. 10 illustrates a partially exploded view of an exemplary embodiment of a modular spray assembly according to an embodiment of the present invention.

FIGS. 6A through 6C illustrate pipings 7, 8 and 9 of varying sizes and shapes which can be used to construct the spray assembly according to the present invention. These pipings may be flexible or rigid. Each of the pipings includes a male threaded portion on the ends so that they may be attached to the fittings of FIGS. 1–3. When the spray assembly is assembled, the elbow shaped fittings 1 are connected to the nozzles 6 by the quick coupler fittings 4 and quick coupling plug 5. One such arrangement is shown in FIG. 10.

FIG. 7 illustrates a top view of a pump 10 which is used in an embodiment of the present invention. An exemplary pump that may be used is the WG-1932 model that is available from Admiral Pump of Springdale, Ark.

FIG. 8 illustrates a drive unit 11 which can be used to drive the pump according to an embodiment of the present invention. An exemplary drive unity or engine, is the model GX160, type K1, variation QX, 5.5 horsepower OHV horizontal shaft engine, available from American Honda Motor Co., Inc.

FIG. 9 illustrates a flow and pressure regulator 12 which can be used in the spray assembly apparatus according to an embodiment of the present invention. The flow and pressure regulator 12 includes a regulator unloader which controls the amount of water which bypasses the pump 10. By reducing the amount of water delivered to the nozzles, the wind effect is reduced. Conversely, as the amount of water through the nozzles is increased, the pressure increases, thus increasing the wind effect and reducing the temperature. The flow regulator may be an AP-550 Regulator/Unloader that is distributed by Admiral Pump in Springdale, Ark.

FIG. 10 illustrates a partially exploded view of an exemplary embodiment of a spray assembly according to the present invention. The spray assembly includes pipings 7, 8 and 9 with male pipe threading on the end to attach to the fittings 1, 2, 3.

The elbow shaped fittings 1 can be arranged to point downward in varying degrees. The fittings 1 are preferably connected to the nozzles 6 through quick coupler fittings 4 and quick coupler plugs 5. The quick coupler fittings and plugs are modular elements, the use of which allows for easy assembly and repair. Where the piping elements join, four-way fittings 2 and three-way T-shaped fittings 3 are used. The quick coupler connections can be used throughout the assembly between the piping elements 7, 8, 9 so that the entire assembly can be quickly and easily assembled and disassembled.

One end of a hose 13 is connected to a center portion of the spray assembly and the other hose end is connected to the pump 10 through the flow and pressure regulator 9. The drive unit 8 is also connected to the pump 10. Another hose 14 is used to connect the pump 10 to a water supply.

Figure 11:
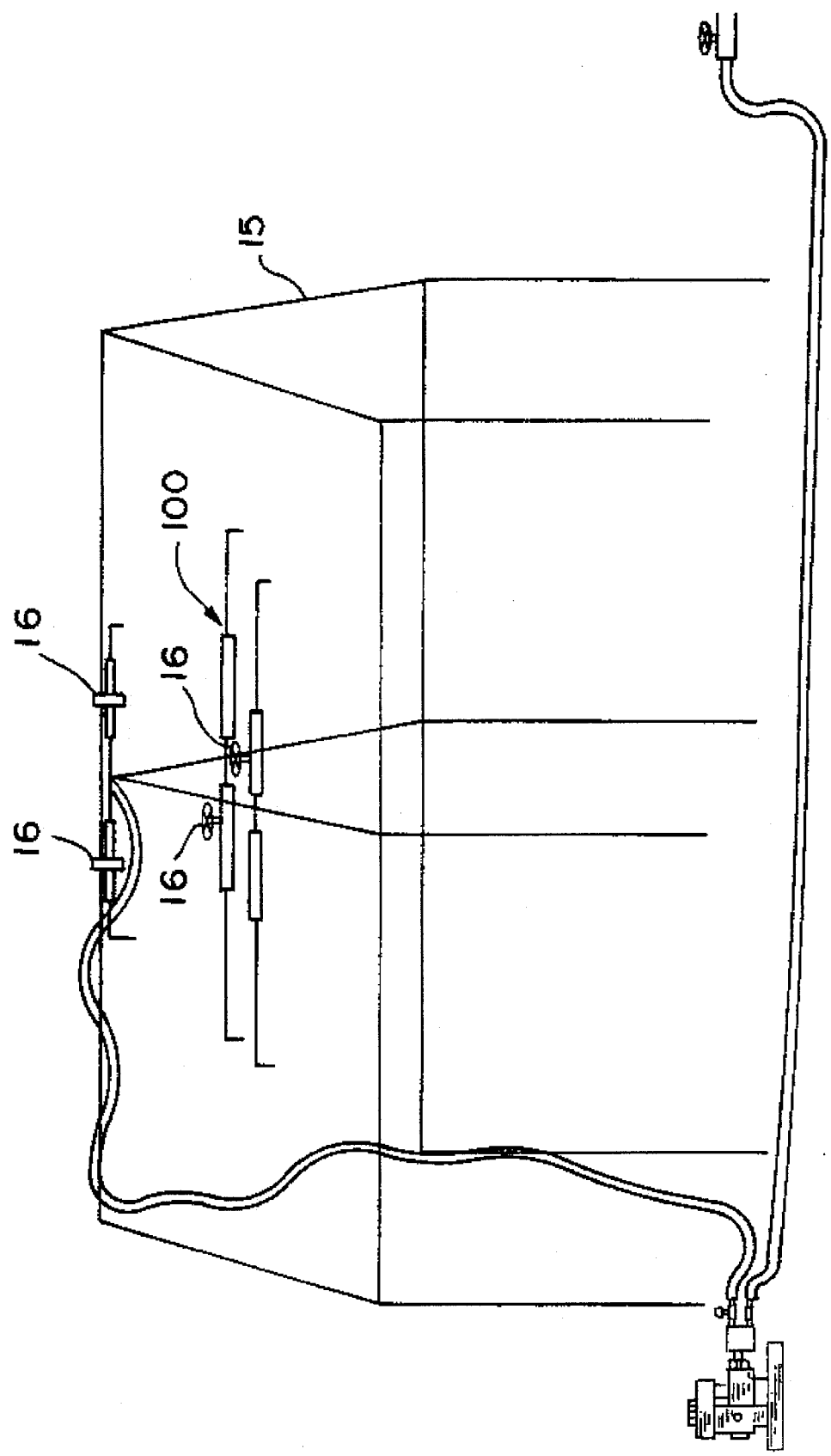
FIG. 11 is an illustration of a spray assembly within a structure according to an embodiment of the present invention.

FIG. 11 illustrates an embodiment of the spraying assembly according to the present invention which has been installed within a structure 15, such as a tent. The tent may include only a roof and a supporting frame, i.e., without walls. Alternatively, the tent may include one or more walls. In another embodiment, the structure 15 may include an inflatable structure having an inflatable floor and walls. In other embodiments of the present invention, the tubing and nozzles may be configured in the open or against a wall, i.e., without a tent or enclosure.

Straps 16 may be used to attach the spray assembly apparatus to the roof or walls of the structure. According to one embodiment, the straps 16 are made of a material flexible, such as nylon, which can be wrapped around the supports for the structure and the piping of the spray assembly.

One embodiment of the present invention involves a temporary structure with a modular spray assembly attached therein. The size and shape of the spray assembly when it is assembled may vary dependent on the dimensions of the structure. For example, an 18'×20' structure may use nine nozzles to achieve the desired mist and wind effect. Other configurations area also possible within the scope of the invention. Additionally, the nozzles are preferably placed at about ten feet from the floor or ground.

With the apparatus according to the present invention, a mist of water may be sprayed from the nozzles of the spraying assembly. The water is delivered using the pump, drive unit, and flow and pressure regulator so that the water is pressurized. When the spray assembly is operated a mist and wind is created due at least in part to the pressurization of the water and the configuration of the assembly. The velocity of the wind depends on several factors. However, the wind could be moving at twenty to thirty miles per hour. The system may also be adjusted so that the wind is moving at five to ten miles per hour.

A cooling effect can be created in at least three different ways by using the present invention. First, as the mist is emitted from the nozzles, sufficient pressure is used so as to create a combination of wind and mist. Accordingly, the wind created by the spray, has a mild wind chill effect on participants. In other words, the mere fact that wind is created in the structure helps to cool people in the structure.

A second way in which a cooling affect is created is through evaporation. As water evaporates, it absorbs heat from the surroundings. In fact, vaporization of water requires more than 500 calories per gram of water. Accordingly, as the fine mist evaporates from liquid droplets into gaseous water, it absorbs heat in the structure, thus cooling the structure.

A third cooling affect is created by the pressure drop that the water experiences as it passes through the nozzle. Specifically, the water inside the tubing prior to emission from the nozzle is under high pressure. As set forth earlier, the water pressure may be as high as 1500 pounds per square inch (psi). As that water passes from the high pressure zone within the nozzle to the atmospheric pressure in the structure, a cooling effect is created.

Considering the three aforedescribed cooling reactions, it should be clear that the amount of cooling in the structure is proportional to the pressure under which the system is operating. In other words, by increasing the pressure at the pressure regulator, an increase in the cooling affect will be experienced by people in the structure thus, the "temperature", or effective temperature within the structure can be easily controlled by controlling the pressure regulator.

Figures 12, 13:
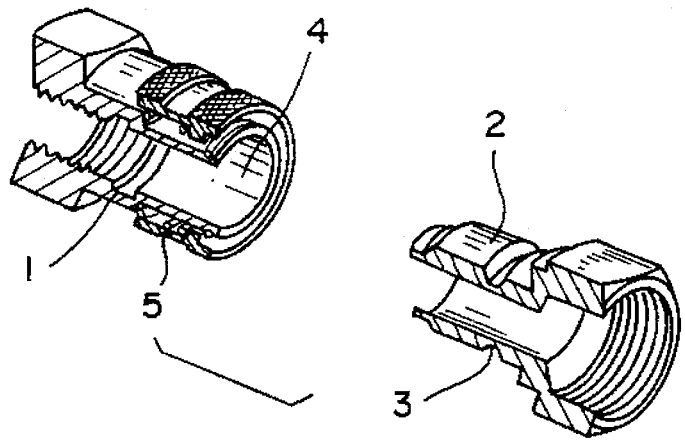
FIG. 12 is a cross-sectional view of a quick coupler connector.
FIG. 13 is a table of nozzle statistics.

According to another embodiment of the present invention, a size 9 nozzle, which emits about 3.5 gallons per minute (G.P.M.) at 600 psi, may be used. A size 9 nozzle has an orifice diameter of about 0.076 inches. FIG. 13 is a chart illustrating the nozzle volume or flow rate in gallons per minute for various nozzles at different water pressure. Although any of the nozzles in FIG. 13 could be used, the smaller nozzles in the table work better than the larger nozzles.

The foregoing description of the specific embodiments will so fully reveal the general nature of the invention that others can, by applying current knowledge, readily modify and/or adapt for various applications such specific embodiments without departing from the generic concept, and, therefor, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A spray apparatus for cooling crowds of people, comprising:

a source of pressurized water;

a plurality of nozzles for spraying the pressurized water;

tubing interconnecting said source to said plurality of nozzles;

said nozzles having an equivalent orifice diameter in the range of 0.026 to 0.070 inches; and said source providing water at a pressure of 600 psi or greater;

said source and nozzles cooperate to produce a mist of water having a flow rate of at least about 3.5 gallons per minute from each nozzle and to produce droplets in the range of 85 microns to 200 microns.

2. The spray apparatus of claim 1, wherein a position of said nozzles is adjustable.

3. The spray apparatus of claim 1, wherein each of said nozzles is connected to said tubing with a quick coupler unit.

4. The spray apparatus of claim 1, wherein said tubing includes a plurality of sections which are connected together with quick coupler units.

5. A spray apparatus according to claim 1, wherein said nozzles have an equivalent orifice diameter of about 0.026 inches in diameter.

6. A spray apparatus according to claim 1, wherein said nozzles are arranged within a tent.

7. A spray apparatus for cooling crowds of people, comprising:

a source of pressurized water;

a plurality of nozzles for spraying the pressurized water;

tubing interconnecting said source to said plurality of nozzles;

said nozzles having an equivalent orifice diameter of about 0.026 inches; and said source and nozzles cooperate to produce droplets in the range of 85 microns to 200 microns, and wherein said pressurized water is delivered to said nozzles at a pressure ranging from 600 psi to 1000 psi.

8. A method of spraying water, comprising the steps of:

providing a source of water pressurized to at least 600 psi; and directing said pressurized water to a plurality of nozzles having an equivalent orifice diameter of about 0.026 inches so that the water is emitted from said nozzles as droplets with a diameter between 85 and 200 microns.

* * * * *